INVENTORS
WALTER ILLG
FRED F. EICHENBRENNER

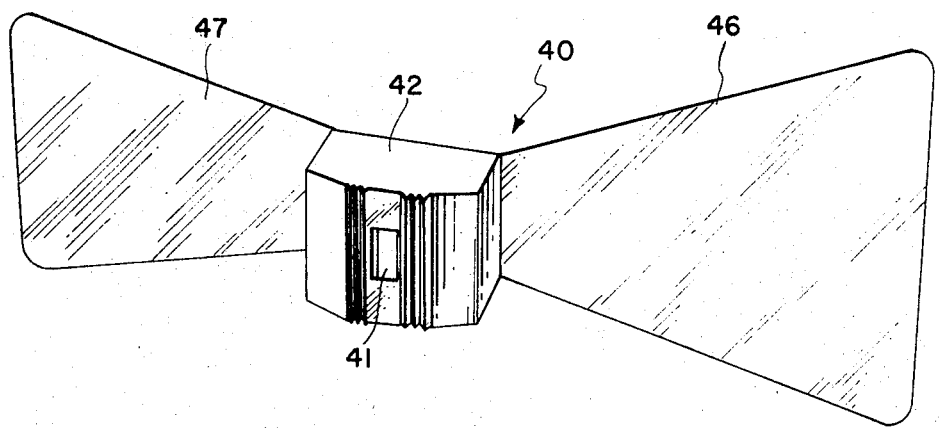
FIG. 3
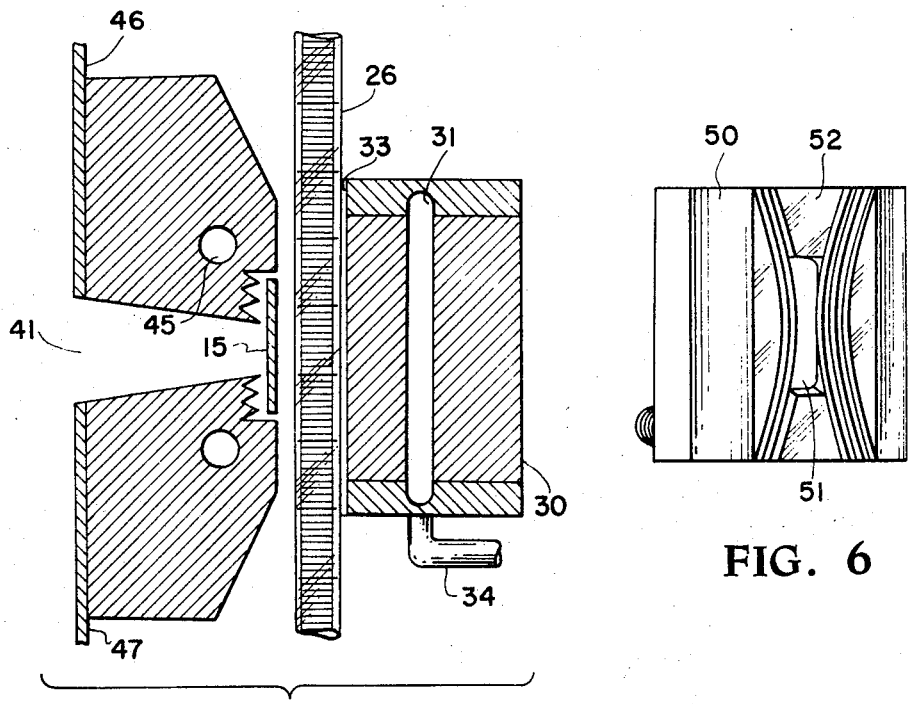
FIG. 5
FIG. 6
INVENTORS
WALTER ILLG
FRED F. EICHENBRENNER
BY
ATTORNEYS United States Patent Office 3,472,060
Patented Oct. 14, 1969

3,472,060
LIGHT SHIELD AND INFRARED REFLECTOR FOR FATIGUE TESTING
Walter Illg, Yorktown, and Fred F. Eichenbrenner, Hampton, Va., assignors to the United States of America as represented by the Administrator of the National Aeronautics and Space Administration
Filed Aug. 31, 1966, Ser. No. 576,792
Int. Cl. G01n 25/02
U.S. Cl. 73—15.6                                   4 Claims

ABSTRACT OF THE DISCLOSURE

Apparatus facilitating fatigue testing of small axially loaded sheet specimens at elevated temperatures in the range of 2000–3000° F. in an ambient atmosphere and under conditions which do not allow mechanical probing of the test area with thermocouples or other contact instruments including a watercooled quartz lamp radiation source, optical pyrometer means for detecting temperature change in a specimen during a test, and shielding for protecting the optical pyrometer from the radiation source.

---

The invention described herein was made by employees of the United States Government and may be manufactured and used by or for the Government without the payment of any royalties thereon or therefor.

This invention relates generally to a light shield and infrared reflector and relates with particularity to a light shield and infrared reflector for use with fatigue testing apparatus wherein small axially loaded sheet specimens may be fatigue tested at elevated temperatures in the range of 2000–3000° F. in an ambient atmosphere and under conditions which do now allow mechanical probing of the test area with thermocouples or other contact instruments.

Interest in the elevated temperature properties of high-strength materials for flight vehicles and the like is increasing as supersonic speeds become more commonplace. The ability of a particular material to maintain strength under elevated temperature conditions is a prime material requirement for flight vehicles and the like. One of the important strength properties for vehicles subjected to continuously varying loads, such as those encountered by any vehicle traveling in the atmosphere, is the fatigue strength. Fatigue life tests must, accordingly, be conducted on each prospective material that is to be used in the construction of flight vehicles and the like.

In order to insure that the fatigue life of a test specimen in the laboratory is not altered, the fatigue specimen cannot be in contact with thermocouples or other contact instruments which presents a problem in obtaining direct temperature measurements of the test specimen during a fatigue test. Accordingly, it is mandatory that a system be developed wherein optical temperature measurements can be obtained of a test specimen during fatigue testing.

It is therefore an object of the present invention to provide an apparatus for fatigue testing of small axially loaded sheet specimens at controlled temperatures at a range of 2000–3000° F. for extended durations in ambient atmospheric conditions.

Another object of the present invention is a provision of an apparatus permitting direct optical pyrometer temperature control of small axially loaded sheet specimens at an elevated temperature range.

A further object of the present invention is an apparatus facilitating fatigue testing of small axially loaded sheet specimens at elevated temperatures.

Yet another object of the present invention is a novel method of fatigue testing sheet specimens in an ambient atmospheric environment and in the temperature range of 2000–3000° F.

According to the present invention, the foregoing and other objects are obtained by providing a test specimen maintained under axial-loaded conditions in position to be heated on one side by a radiation source with an optical pyrometer being disposed to view the other side of the test specimen for detecting the temperature rise in the test specimen during the test. A light shielding device is provided to protect the optical pyrometer from the intense radiation during testing and a flow of coolant is maintained through suitable passageways in both the shield and the support for the radiation source during testing to prevent undue temperature rise in these components.

A more complete appreciation of the invention and many of the attendant advantages thereof will be readily appreciated as the same becomes better understood by reference to the following detailed description when considered in connection with the accompanying drawings, wherein:

FIG. 3 is a view of the light shield of the present invention taken from the opposite direction as that shown in the assembly of FIG. 1;

FIG. 5 is a sectional view of the reflector and light shield of the present invention as taken essentially along line 5—5 of FIG. 4; and FIG. 6 is a view of a modified form of the light shield for use in testing "hour-glass" shaped sheet specimens.

Figure 1:
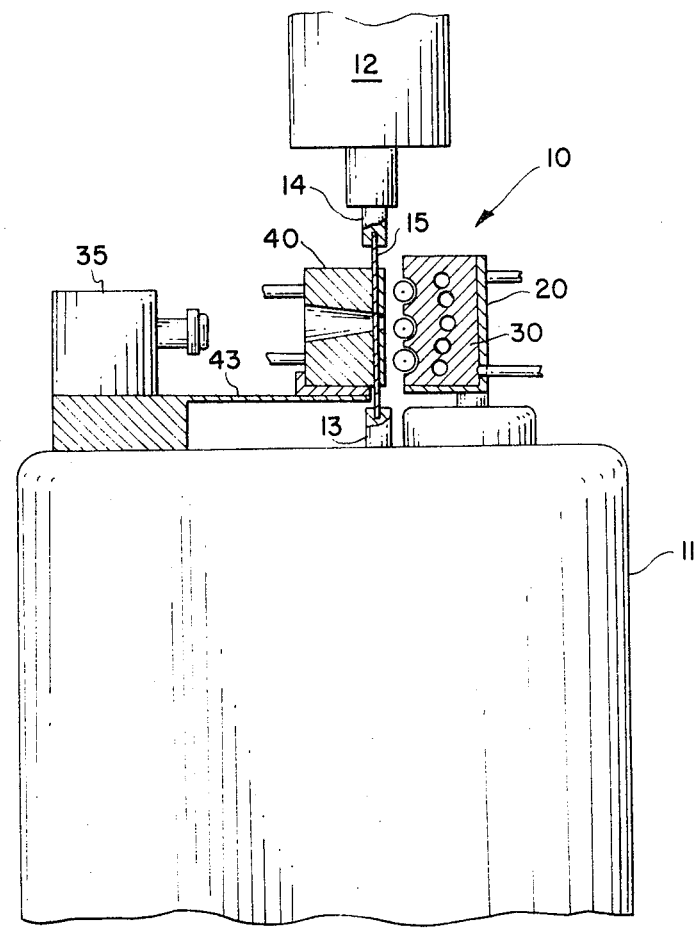
FIG. 1 is a part sectional, part schematic view of a fatigue test machine employing the light shield and infrared reflector according to the present invention.

Referring now to the drawings wherein like numerals designated like or corresponding parts throughout the several views, and more particularly to FIG. 1, there is shown the apparatus, generally designated by reference numeral 10 employed in accordance with this invention for testing the fatigue life of small axially loaded sheet speciments. Apparatus 10 includes a conventional fatigue testing machine having a base portion and a headpiece schematically shown and designated, respectively, by reference numerals 11 and 12. A pair of friction retention clamps 13 and 14 are disposed, respectively, in connection with base 11 and headpiece 12 and serve to retain a test specimen 15 there-between under controlled axial loads in a conventional manner. A high intensity heat and light radiating unit, as designated by reference numeral 20 is disposed in removably attached relationship on the top surface of base 11. A light shield 40 is adjustably disposed relative to the radiation unit 20 and serves to shield optical pyrometer 35 from the intense radiation emitted by radiation unit 20 during a test. A bracket 43 extends from the mechanism containing pyrometer 35 and serves to support light shield 40 a fixed distance from the pyrometer lens. Conventional mechanism, such for example a worm drive, not shown, provides the adjustment needed to place shield 40 in operative position.

Figure 2:
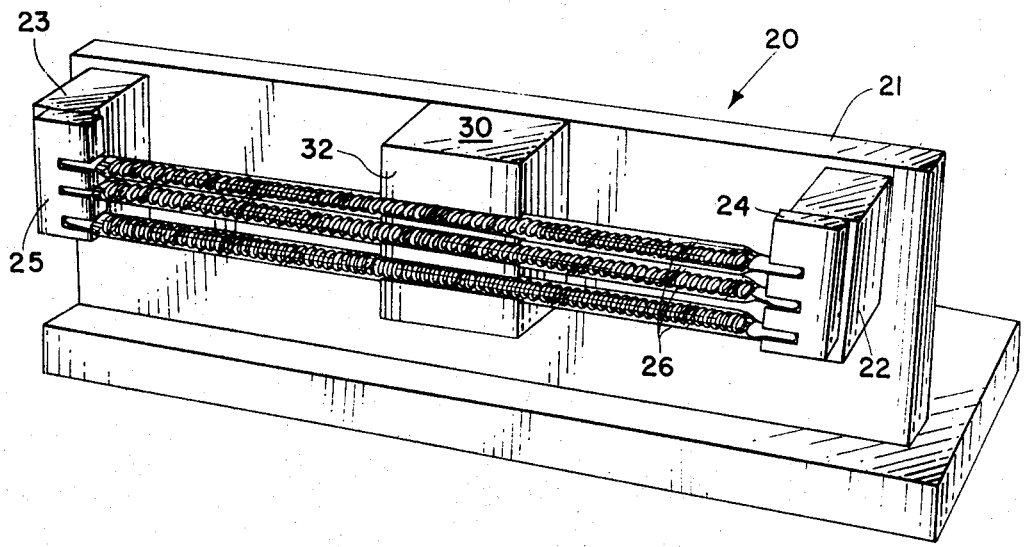
FIG. 2 is a view of the radiation source and infrared reflector of the present invention with the light shield removed therefrom.
Figure 4:
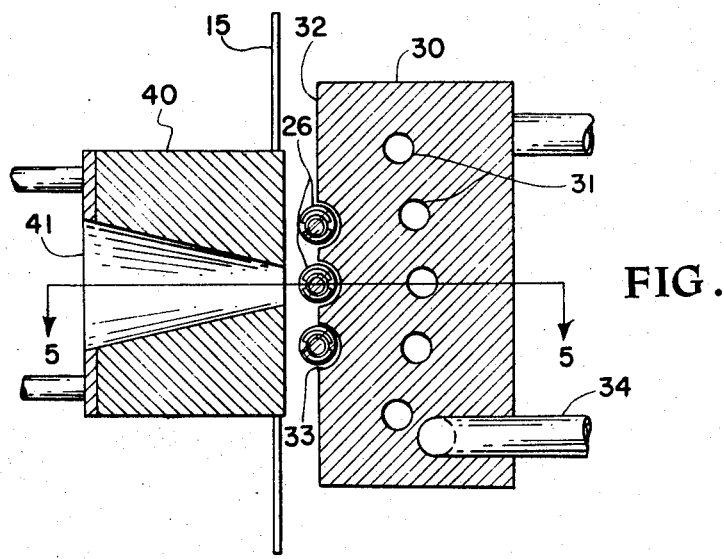
FIG. 4 is an enlarged sectional view of the light shield and reflector shown in FIG. 1.

Referring now more particularly to FIGS. 2 and 4, radiation unit 20 includes a substantially rectangular shaped, heat-resistive, non-conductive mount 21 having a pair of integrally attached arms 22 and 23 at opposite ends thereof. Arms 22 and 23 are constructed of a like or similar material as mount 21. A pair of electrically conductive connectors 24 and 25 are provided, respectively, on the ends of arms 22 and 23. Electrical connectors 24 and 25 are in electrical connection with a suitable conventional electrical power source, not shown, and serve to support and provide electrical contact with a plurality of longitudinal quartz lamps, as designated by reference numeral 26.

A radiation reflector 30 is disposed in fixed relationship between quartz lamps 26 and mount 21. Reflector 30 includes a heat conductive housing having a number of interconnecting coolant passageways 31 (FIG. 4) therein and an external reflective surface area 32. Surface 32 is constructed of a highly polished reflective metal such for example, polished aluminum, gold plate or the like. Surface 32 is provided with a plurality of reflective, straight, semi-cylindrical grooves 33 (FIG. 4) formed therein in equidistant spaced mutually parallel relationship. Quartz lamps 26 are disposed in contacting relationship within individual ones of grooves 33. This contacting relationship between lamps 26 and surface 32 facilitates exterior cooling of the lamps, by conduction, to thereby permit lower exterior lamp operating temperatures and, accordingly, more heat to be generated by the lamp filaments for reflection onto the surface of test specimen 15. A conduit system 34 is provided in fluid connection with a suitable water supply, not shown, to provide for a flow of water through the interconnecting passageways 31 in the interior of reflector 30 during operation of the apparatus to maintain the reflector relatively cool and prevent damage thereof from the intense radiation produced by quartz lamps 26.

Referring now more particularly to FIGS. 3 and 4, light shield 40 is attached to and supported by bracket 43 in adjustably spaced relationship with the quartz lamps 26. Distance adjustment of shield 40 is accomplished by movement of the mechanism supporting pyrometer 35 and its attached bracket 43 in a conventional manner. Light shield 40 is provided with a central opening 41 therein (FIG. 5) with the end of the opening facing the quartz lamps 26 terminating in a notched perpendicular groove 42. Groove 42 is patterned to the edge shape but slightly larger than the sheet specimen 15 to be fatigue tested. The opposite end of opening 41 serves to permit the optical pyrometer 35 (FIG. 1) to view sheet specimen 15. Pyrometer 35 serves to directly and visually obtain accurate temperature measurements of sheet specimen 15 during a test.

As shown more particularly in FIG. 5, the sheet specimen 15 is disposed within but spaced from the edge of groove 42. A plurality of parallel notches are provided vertically along groove 42 in light shield 40 to trap any light that enters through the clearance between test specimen 15 and the edge of the groove. These notches thus prevent any interference of the optical pyrometer temperature measurement of specimen 15 as taken through the opening 41. The edge of groove 42 and the notch surfaces therein are black to facilitate absorption and trapping of radiation received therein while the remaining face portions of shield 40 are provided with a highly reflective surface to prevent undue absorption of radiation by shield 40. Light shield 40 is also provided with a plurality of interconnecting coolant passageways 45 for the flow therethrough of coolant water from conduit system 34 during a test operation, as shown more particularly in FIGS. 1 and 5.

A pair of flared prolongations 46 and 47 extend from each side of light shield 40. Prolongations 46 and 47 are of adequate dimensions so as to shield pyrometer 35 from the intense radiation produced by lamps 26 during a test operation. As shown more clearly in FIGS. 3 and 5, the invention described thus far is confined to use with only rectangular sheet specimens due to the edge shape provided for groove 42 in the face of light shield 40.

Referring now to FIG. 6, a slight modification of the light shield is shown and designated by reference numeral 50. In this embodiment, opening 51 leads to groove 52 which is provided with curved leading edges so as to accommodate test sheet specimens of substantially "hour-glass" planform. The trap notches in shield 50 are disposed in spaced parallel relationship with the edge surface of groove 52 and perform the same function as that described hereinbefore for the notches in light shield 40. It is thus seen that the present invention is readily adaptable for use in fatigue testing of any straight, curved, or other planform sheet specimen, the only requirement being that the groove and notches provided in the light shield face must be patterned to the edge shape of the test sheet specimen.

OPERATION

In operation of the present invention, the test assembly is set up essentially as shown in FIGS. 1, 4 and 5 with test specimen 15 being placed under the desired load by the fatigue testing machine. Light shield 40 and its support bracket 43 are adjusted so as to position the groove 42 therein essentially around the edges of test specimen 15, as shown more particularly in FIG. 5, with a slight clearance being provided at each edge of the test specimen and a slight clearance between the test specimen and the edges of the notches disposed in the groove sides. The quartz lamps 26 are then turned on by actuating the electrical power supply, not shown, with the temperature of the test specimen 15, as heated, being observed by the optical pyrometer view through the opening 40. Reflector 30 concentrates and focuses the radiation from quartz lamps 26 onto test specimen 15 thereby heating only one side because the optical pyrometer 35 must "see" only the specimen's own emittance and no reflections. It is for this reason that the notch edges in groove 42 are constructed as shown in FIG. 4. Thus, any radiation that passes between the edges of specimen 15 and light shield 40 is essentially trapped by the design of the notch surfaces therein. The clearance between specimen edges 15 and the groove edges is a maximum of approximately $\frac{1}{32}$ of an inch. The unique design of the notches traps most of the light that enters through this clearance and what little does get through does not affect the pyrometer readings within its own error limitations.

A flow of coolant, such for example cool tap water, is passed through conduit system 34 through both the reflector body 30 and the light shield body 40 through their respective passageways, as shown more clearly in FIGS. 4 and 5, to prevent undue temperature rise in these elements during sustained high temperature fatigue testing of specimen 15. Details of the coolant system connection between the elements have been omitted in the interest of clarity. It has been observed that the temperature rise in cooling water flowing through these elements during a sustained test does not exceed approximately 20–30° F., which is well within the permissible limitations of the system.

Although only specific embodiments of the invention has been described and illustrated, it is readily apparent that any planform sheet specimen may be readily tested by the present invention, the only requirement being that the groove and notches in the light shield must be patterned to the edge shape of the sheet specimen. Additionally, any metal or metal alloy sheet specimen may be tested by the use of the present invention within the temperature range described. It is to be understood, therefore, that the foregoing disclosure relates only to preferred embodiments of the present invention and that numerous modifications and variations are possible in the light of the above teachings, as will be readily apparent to those skilled in the art, without departing from the spirit and scope of the present invention as set forth in the appending claims.

What is claimed and desired to be secured by Letters Patent of the United States is:

1. Apparatus facilitating testing fatigue life of axially loaded sheet specimens at elevated temperatures wherein the test sheet specimen is subjected to heat from only one side and in which direct optical temperature measurements are permitted during testing at specimen temperatures in the range of 2000–3000° F. comprising, in combination:

a sheet specimen to be tested, retention means for maintaining said sheet specimen under an axial load, quartz lamp radiation means for heating said sheet specimen to a temperature in the range of 2000–3000° F., reflector means for focusing radiation from said radiation means onto selected portions of said sheet specimen, shield means receiving said test specimen so as to confine the reflected radiation to essentially one side of said specimen, optical pyrometer means for indicating direct temperature measurement of the other side of said specimen while said one side is being subjected to radiation, said shield means serving to shield the lenses of said pyrometer and the other side of said specimen from the intense radiation produced by said radiation means, and cooling means for maintaining said reflector means and said shield means relatively cool while said radiation means heats said sheet specimen.

2. The apparatus of claim 1 wherein said reflector means is in contacting relationship with said radiation means, said reflector having a reflective surface selected from the group consisting of polished aluminum and gold plating.

3. The apparatus of claim 1 wherein said shield means is provided with a groove patterned to the edge shape of said sheet specimen and said specimen is disposed within said groove and slightly spaced from said shield during testing.

4. The apparatus of claim 3 wherein the edges of said groove in said shield means is provided with notch trap means to trap essentially all radiation passing between said specimen and said shield.

References Cited

UNITED STATES PATENTS

| | | |
|---|---|---|
| 3,148,531 | 9/1964 | Stoll et al. |
| 3,157,728 | 11/1964 | Comstock _____ 73—355 XR |
| 3,165,915 | 1/1965 | Parker et al. |
| 3,187,574 | 6/1965 | Mason et al. _____ 73—355 |
| 3,293,909 | 12/1966 | Gledhill _____ 73—15.6 XR |
| 3,373,599 | 3/1968 | Higginbottom _____ 73—15 |

OTHER REFERENCES

An article from "The Review of Scientific Instruments," vol. 34, No. 5, May 1963, pp. 500–504 entitled, "Apparatus for Tensile Testing to 5400° F. in Vacuum," by J. L. Taylor.

JAMES J. GILL, Primary Examiner